United States Patent [19]

Schmidt, Sr. et al.

[11] 3,991,876

[45] Nov. 16, 1976

[54] SANITARY LINKAGE CONNECTION MEANS FOR FOOD PRODUCTS PROCESSING CONVEYOR

[76] Inventors: Jacob Schmidt, Sr.; Jacob Schmidt, Jr., both of R.D. No. 1, Harleysville, Pa. 19438

[22] Filed: Apr. 25, 1975

[21] Appl. No.: 571,806

[52] U.S. Cl. ............................... 198/831; 198/848; 198/851
[51] Int. Cl.² ........................................ B65G 15/00
[58] Field of Search ........... 198/181, 182, 189, 195, 198/136

[56] References Cited
UNITED STATES PATENTS

| | | | |
|---|---|---|---|
| 557,390 | 3/1896 | Huebner | 198/209 |
| 1,354,553 | 10/1920 | Harter | 198/195 |
| 3,270,863 | 9/1966 | Ackles | 198/181 |

*Primary Examiner*—John J. Love
*Assistant Examiner*—Douglas D. Watts
*Attorney, Agent, or Firm*—C. Hercus Just; Samuel M. Learned, Jr.

[57] ABSTRACT

The present invention relates to a sanitary linkage connection assembly which pivotally interconnects transverse bars to form a food processing conveyor comprising an endless belt in which a plurality of laterally spaced transversely extending rod members are connected in spaced relationship by respective link members of the linkage connection assembly, achieved by welding one end of each link to an end of each rod to provide an endless belt having an overall smooth external linkage structure which is substantially without surfaces or spaces receptive to the accumulation and retention of food particles which form contaminants when in a conveyor belt of the type described for use upon a transport device in food processing operations and thereby provide a linkage connection assembly in a conveyor which is easily cleaned to maintain it in a sanitary condition.

3 Claims, 8 Drawing Figures

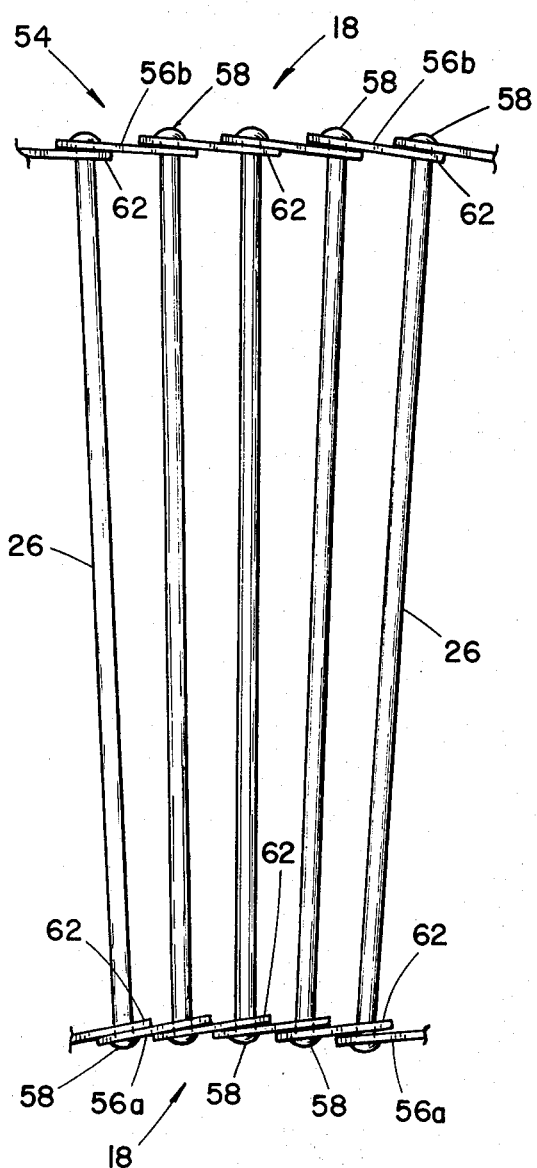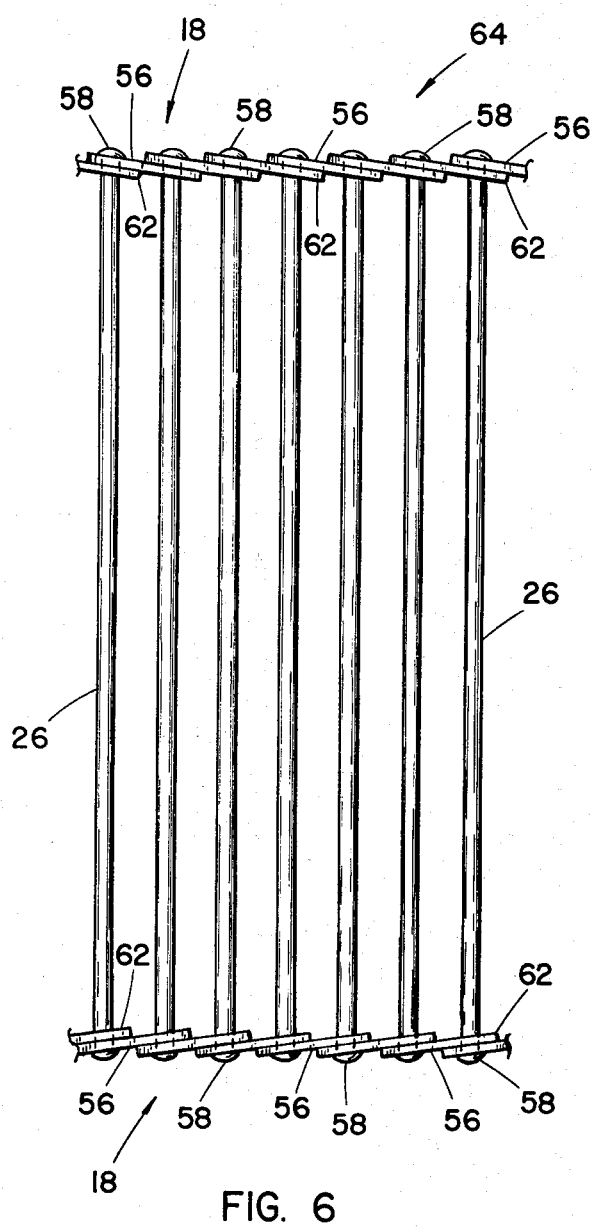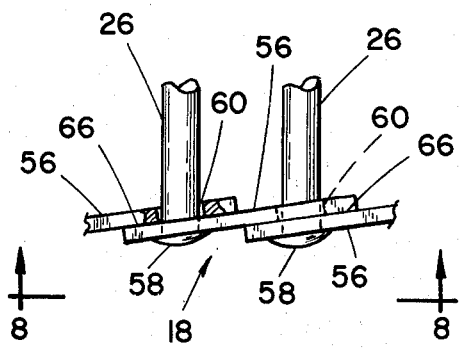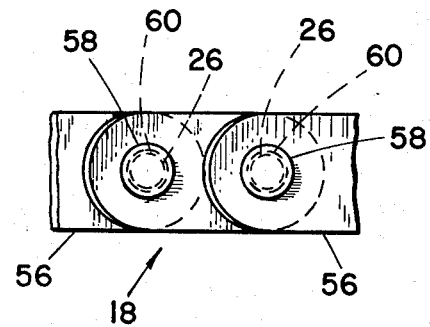

SANITARY LINKAGE CONNECTION MEANS FOR FOOD PRODUCTS PROCESSING CONVEYOR

BACKGROUND OF THE INVENTION

The present invention relates to a sanitary linkage connection means for a food products endless conveyor having a rod type construction such as those which are commonly utilized upon conveyors in the meat processing industry for transport functions during butchering and packing operations. It should be pointed out that the term "sanitary linkage connection means", as herein used, is employed to denote a rod connecting linkage structure for assembling a conveyor belt of the type described, wherein the linkage structure and the means by which they are connected to the transverse rods of the conveyor are characterized by having a smooth external configuration which substantially eliminates surfaces and spaces conducive to the accumulation and retention of food particles which produce contaminants during employment of said conveyor as a transport means in food processing operations, as well as providing an open and exposed conveyor belt linkage structure which is easily cleaned and maintained in a sanitary condition.

Both wire mesh and rod type belt assemblies for use as meat products conveyors of either a curved or straight linear configuration have long been known. Primarily, the linkage means employed for interconnecting the transverse bars of conveyor belts of the prior art disclosures are mechanically functional, but, however, as a consequence of incorporating linkage connection means which inherently embody multiple spaces, crevices and surfaces receptive to the collection and retention of food particles, are not substantially satisfactory from the standpoint of providing a conveyor belt that is readily capable of being maintained in a sanitary condition during operation of such conveyor belts while used to transport food products.

Exemplary of disclosures which show linkage connection means for conveyor belt assemblies that are mechanically suitable for utilization upon food products processing conveyors, but which possess limitations with regard to sanitary features as heretofore described, are those set forth in U.S. Pat. No. 3,160,264 to Raybould, dated Dec. 8, 1964; U.S. Pat. No. 3,255,898 to Roinstad, dated Dec. 28, 1965; and U.S. Pat. No. 3,225,901 to Heinisch, dated Dec. 28, 1965. The patents to Raybould and Heinisch each teach rod conveyor linkage connection means of the socalled "single link" type, wherein a row of link members, respectively comprised of a single leg construction, are interconnectably affixed to the respective ends of transverse rod members of the conveyor belts, and to each other, to fabricate the conveyor belt assembly. It will be noted, as shown in both the aforementioned disclosures, that various surface voids are inherent within the linkage connection means disclosed in said patents, said voids being receptive to the collection and accumulation of food particles and waste which resist ready removal in cleaning operations. In all such disclosures, wherein the basic means for interconnectably assembling conveyor belt links to rods, and links to links, the use of lock nuts, cotter pins, hook means, press-on lock washers, snap rings, and the like, voids and surfaces are present which are not conducive to the maintenance of a sanitary condition.

The patent to Roinestad discloses linkage connection means for rods of the so-called "double link" type, wherein a row of link members respectively comprised of a double leg construction are interconnectably affixed to the opposite ends of transverse rod members of the conveyor belt, and to each other, to fabricate the same to form said conveyor belt assembly. As with the single link rod type conveyor belt connection disclosures heretofore cited, the double link assembly likewise provides multiple voids and surfaces, of a correspondingly greater number, conducive to the accumulation and retention of food particles, thereby also not being a structure conducive to the maintenance of a sanitary condition.

The objectionable features and shortcomings of prior art food products conveyor belt structures and especially the linkage connection means for the rods, as heretofore discussed, are obviated by employment of a sanitary linkage connection means embodying principles of the present invention, which provide a substantially improved linkage connection means for a food products conveyor, the details of which are as follows.

SUMMARY OF THE INVENTION

It is the principal object of the present invention to provide a sanitary linkage connection means for the transverse rods of a food products conveyor comprising an endless belt assembly composed of a plurality of interconnected transversely extending rod members spaced apart and wherein the respective link members per se of said linkage connection means each have a straight smooth external structure weldably and pivotally connecting the ends of said rod members of said belt assembly in such a manner as to substantially eliminate voids or surfaces conducive to the accumulation and retention of food particles and waste during operation of said conveyor as a transport means in food processing operations, as well as providing an open and exposed conveyor belt linkage connection means which is easily cleaned and maintained in a sanitary condition by simple flushing with a solution of hot water and detergent or similar means.

It is an additional object of the present invention to provide a sanitary linkage connection means for a food products conveyor wherein each rod member comprising the endless belt assembly thereof has weldably connected respectively to the opposite ends thereof one end of a pair of link members embodying the principles of the present invention, each of which link members in turn are pivotally connected at the other ends thereof to the next successive rod member by means of said rod member extending through holes in said other ends thereof which is likewise weldably connected at the respective transverse ends thereof to one end of additional similar link members assembled slidably against the outer surfaces of said first-mentioned link members, thereby, in edge view, said assembled link members are shingled fashion and by such arrangement produce a transversely stable endless conveyor belt structure having minimal operational stretch and wear characteristics as well as being sanitary.

It is another object of the present invention to provide a sanitary linkage connection means for a food products conveyor wherein the conveyor belt sideguide and tracking functions are furnished by rotatably movable, limited engagement of the inner surfaces of the link members of the transversely stable conveyor belt structure with the outer side surfaces of the drive and idler sprockets for the conveyor.

A further object of the present invention is to provide a sanitary linkage connection means for a food products conveyor wherein the conveyor belt member thereof has a minimum number of component parts, is relatively simple to fabricate, and yet is sufficiently durable to be suitably employed in continuous heavy-duty use at normal, elevated, or low temperature conditions and suitable speeds.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 5 is a fragmentary enlarged top plan view of a curved rod type conveyor belt interconnectably assembled by employing sanitary linkage connection means embodying the principles of the present invention.

FIG. 6 is a fragmentary enlarged top plan view of a straight rod type conveyor belt interconnectably assembled by employing sanitary linkage connection means embodying the principles of the present invention.

FIG. 7 is a fragmentary enlarged top plan view of one side edge of the link member/rod conveyor belt connection assembly.

FIG. 8 is a fragmentary end view of the link member/rod conveyor belt connection assembly as seen along the line 8—8 of FIG. 7.

DETAILED DESCRIPTION OF THE INVENTION

Figure 1:
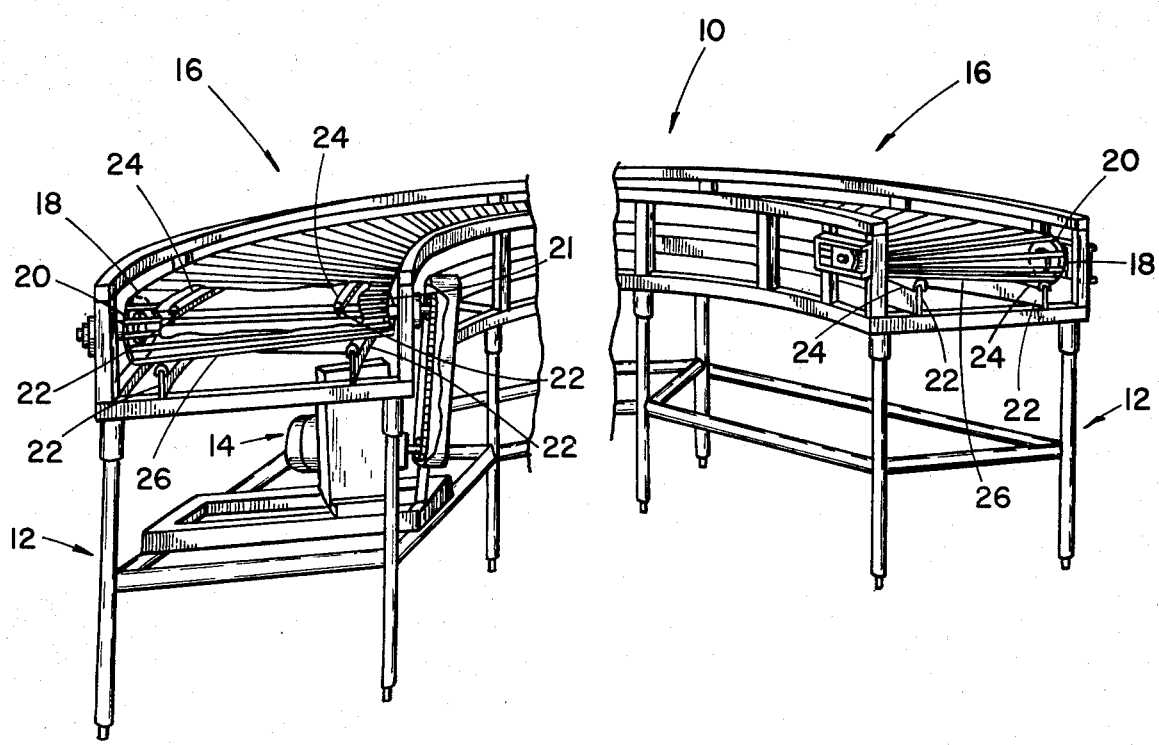
FIG. 1 is a front perspective elevation view of an exemplary curved food processing conveyor equipped with a rod type conveyor belt employing the sanitary linkage connection means embodying the principles of the present invention, the view being foreshortened to better accommodate the same to the sheet.

Referring to FIG. 1, a foreshortened front elevation view is shown of a typical exemplary curved section of a food processing conveyor 10, having a supporting frame structure 12 comprised of interconnected horizontally and vertically disposed support members. A drive means 14 of conventional type is shown equipped with a rod type conveyor belt 16 which is connectably assembled with sanitary linkage connection means 18 embodying principles of the present invention. Said rod type conveyor belt is driven and guided by drive sprockets 20 and 21 respectively positioned at opposite ends of the conveyor section.

Also referring to FIG. 1, to further explain certain additional mechanical features which are therein best illustrated, it will be seen that the conveyor belt support members 22 each have connected to the upper edges thereof a Mylar runner 24 co-extensive therewith to reduce the frictional effects while slidably supporting the rod members 26 during movement of said conveyor belt 16 along said support members. It will be noted that the remainder of the conveyor structure per se, as illustrated in FIG. 1, is generally of a conventional design and construction, and may be of a curved configuration, as shown, or of a straight linear horizontal or inclined configuration which is not specifically shown but suitable for incorporation of the invention therein. The conveyor may, if desired, be provided with one of a number of various types of conventional belts, such as any of those respectively illustrated in FIGS. 2 through 4. More importantly, however, the conveyor can be provided with a conveyor belt embodying sanitary constuction features exemplified by the present invention, in either a curved or straight linear configuration, as appropriate, examples of which features are respectively illustrated in FIGS. 5 and 6.

Figure 2:
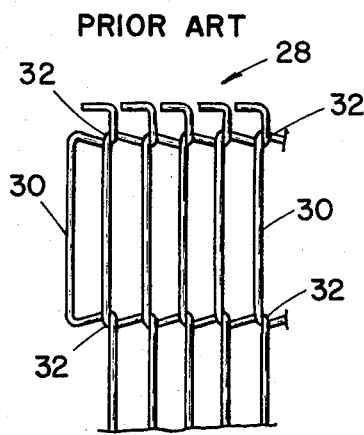
FIG. 2 is a fragmentary enlarged top plan view of an exemplary prior art wire-mesh type conveyor belt assembly structure currently employed on food processing transport equipment, the view being foreshortened to better accommodate the same to the sheet.
Figure 2:
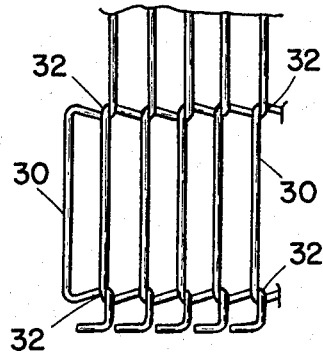

In FIG. 2 a fragmentary top plan view of an exemplary prior art wire-mesh conveyor belt 28 is shown, which is a type sometimes employed upon food processing conveyors. The belt 28 is fabricated from wire stock of a suitable type, and is formed by bendably interconnecting one wire member 30 to the next in a successively repetitive pattern to provide a belt assembly generally as shown. Also as shown, the interconnecting loops 32, on wire members 30 inherently provide a plurality of surface areas and positions conducive to the accumulation and retention of particles of food products and contaminants, thereby comprising an unsanitary construction in use by rendering the wire-mesh conveyor belt difficult to clean and maintain in a sanitary condition. Further, due to the lightweight construction, a wire-mesh conveyor belt is not generally suitable for employment under conditions of heavy duty use such as is normally required in meat processing operations.

Figure 3:
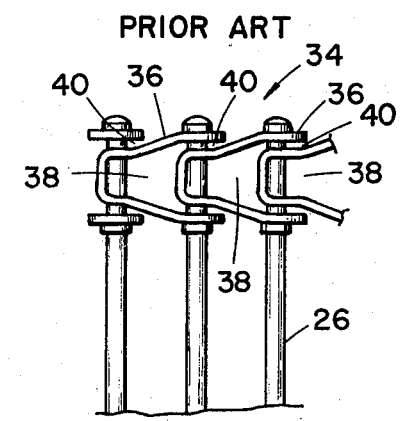
FIG. 3 is a fragmentary enlarged top plan view of an exemplary prior art double-link type rod conveyor belt assembly structure currently employed on food processing transport equipment, the view being foreshortened to better accommodate the same to the sheet.
Figure 3:
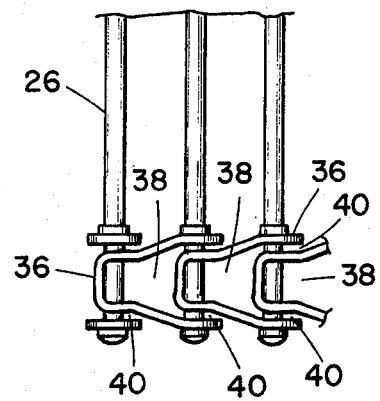

FIG. 3 is a fragmentary top plan view of an exemplary prior art double-link rod type conveyor belt assembly, which is another prior art transport means which may be employed upon a food prouducts processing conveyor. The belt 34 is comprised of rod members 26 interconnectably assembled, one to the other, by means of double-link connection means 36 to effect an articulated conveyor belt assembly. The double-link assembly conveyor belt structure provides transversely disposed cleated spaces 38 for engagement of the conveyor drive and idler sprockets, not shown, whereby the conveyor belt 34 guide and tracking functions are accomplished. Mechanically, the double-link type conveyor belt 34 provides a construction generally suitable for heavy duty use applications such as normally required in meat processing operations. However, it will be seen that the double-link structure inherently provides recesses 38 and 40 conducive to the accumulation and retention of particles of food products and contaminants, thereby, also, comprising an unsanitary construction in use, as a result of the double-link connection means being difficult to clean and maintain in a sanitary condition.

Figure 4:
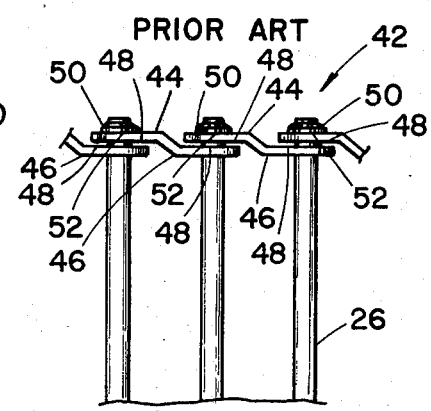
FIG. 4 is a fragmentary enlarged top plan view of an exemplary prior art single-link rod type conveyor belt assembly structure currently employed on food processing transport equipment, the view being foreshortened to better accommodate the same to the sheet.
Figure 4:
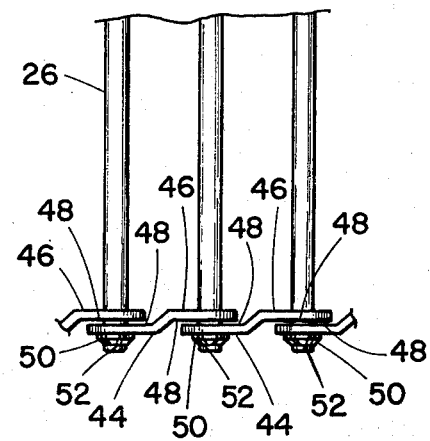

The view shown in FIG. 4 is a fragmentary top plan illustration of an exemplary prior art single-link rod type conveyor belt assembly, which is also another prior art transport means which may be employed upon a food products processing conveyor. The belt 42 is comprised of rod members 26 interconnectably assembled, one to the other, by means of single-link connectors 44 to provide an articulated conveyor belt assembly. The single-link assembly conveyor belt structure provides transverse drive and idler sprocket guide and tracking functions by the use of surfaces 46, which slidably engage the outer face surfaces of drive and idler sprockets in a limiting manner, said drive and idler sprockets not being shown. It will be noted that the illustrated exemplary single-link assembly conveyor belt structure likewise inherently provides recessed surfaces 48 conducive to the accumulation and retention of particles of food products and contaminants, thereby, also, comprising an unsanitary construction in use as a result of the type of single-link connection means employed therein which is difficult to clean and maintain in a sanitary condition.

One of the principal factors to consider with respect to providing sanitary features in a conveyor for food products is the means provided to affix the rod members 26 to the connecting links. In the illustration shown in FIG. 4, the exemplary aforementioned connectors comprise press-on lock washers 50, which, however, are exemplary only of the prior art disclosures, and could likewise be lock nuts, cotter keys, bent sections at the transverse terminal ends of the rod members 26, or the like. All of these exemplary prior art connector means, in any event, inherently provide additional recessed surface openings, exemplified by numeral 52, said openings 52 being conducive to the accumulation and retention of particles of food and contaminants which further increase the difficulty of cleaning and maintaining a sanitary condition, and thereby precluding a sanitary construction as heretofore defined.

The illustration in FIG. 5 shows an enlarged fragmentary top plan view of a curved rod-type conveyor belt 54, the rods of which are connected together by sanitary connection means 18 embodying principles of the present invention. In the curved, rod-type conveyor belt construction, as illustrated in FIG. 5, the individual sanitary link members 56a, which are the interior sanitary connecting links, are of a shorter longitudinal connecting dimension than that of the exterior sanitary connecting links 56b. The difference in longitudinal connecting dimension between the interior and exterior sanitary connecting links 56a and 56b is equivalent to the compensatory difference in the pitch diameter angle between the interior and exterior drive and idler sprockets, not shown, but which, however, have the same number of sprocket teeth but correspondingly different diameters as can be seen from FIG. 1. wherein sprockets 20 and 21 are shown.

The method of rigidly connecting the respective interior and exterior sanitary connecting links 56a and 56b of a curved belt assembly to rod members 26 is by means of inserting the respective transverse ends of said rod members 26 through openings in one end of said sanitary connecting links and then welding said ends of the links to the ends of said rods at a slight inwardly inclined angle, as clearly shown in FIGS. 5–7. The corresponding end of the next rod is then passed through the opening in the opposite end of each link for pivotal assembly therewith and the projecting end of the rod is disposed within the first-mentioned opening of the next link and is affixed thereto by welding. The welded ends of the rods then may be suitably ground and/or polished to provide a smooth surface of any recesses for the retention of food products waste material, as well as providing a rigid connection of one end of said links to the end of each rod.

The opposite end of each link is pivotally connected to the next succeeding rod, whereby the welded connection of one end of each link to each rod accurately maintains the ends of successive rods pivotally within the openings 60 in the respective links 56a and 56b. Said openings 60 are best shown in FIGS. 7 and 8 which are fragmentary enlarged views of said sanitary link connectors 18. The interior and exterior sanitary connecting links 56a and 56b thus are arranged somewhat in shingled relation as seen in FIGS. 5–7 and the respective welded and pivoted end of each pair of adjacent links are in close slidable and pivotal relationship so as to offer no recesses or surfaces in or upon which any food particles may accumulate or adhere so as to present an unsanitary condition or situation. The arrangement also renders the conveyor capable of being quickly and readily cleansed by suitable cleaning solutions of conventional type and applied in conventional ways. Further, the construction of the rods and links is capable of rendering the conveyor suitable for so-called heavy duty operation since the links are flat and are subject only to longitudinal tension. The assembly occurs in rod to rod manner, with the aid of suitable jigs, not shown, and the completed conveyor is such that the links and rods are self-maintained in operative relationship.

It should be noted that the transverse guide and tracking functions of a rod-type conveyor belt embodying the principles of the instant invention, as with the previously discussed prior art single-link connection means, are provided by means of limited engagement of the surfaces 62 of the sanitary connecting links with the outer face surfaces of the drive and idler sprockets of the conveyor, such as sprockets 20 and 21 shown in FIG. 1.

The sanitary linkage connection means 18 herein disclosed is preferably constructed of the same material as the rod members 26 of the conveyor belt, the preferred material thereof being metal, such as stainless steel, but any other suitable material may be used.

The illustration in FIg. 6 is similar to that shown in FIG. 5, but showing an enlarged fragmentary top plan view of a straight rod-type conveyor belt 64, wherein the individual sanitary connecting links 56 are transversely affixed to the ends of rod members 26 by means of weldments 58, as heretofore described, but the respective link members 56 are of equal longitudinal dimension, thereby providing a sanitary belt structure of straight linear configuration. The means of operationally employing the straight belt 64 upon a conveyor 10 is similar to that as heretofore described for employing the curved belt 54 except that the belt support members 22 and Mylar runners 24 are straight, the same being supported by correspondingly straight frame means.

The illustration shown in FIG. 7 is a fragmentary, enlarged top plan view of the sanitary linkage connecting means 18, as seen along the bottom of FIG. 6, and showing in greater detail the linkage assembly and weldments 58, as well as showing the closely abutting bearing surfaces 66 between interconnected sanitary link members 56, all of which provides a substantially improved sanitary structure as heretofore described. The view seen in FIG. 8 is an end elevation of the conveyor section shown in FIG. 7, as seen on the line 8—8 therein, and presents another illustration showing the link faces of the sanitary linkage connecting means 18 and the method of assembly thereof.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A sanitary food conveyor frame section having elongated guide means thereon extending longitudinally between opposite ends thereof and having drive and idler sprockets respectively adjacent the opposite lateral sides thereof, in combination with an articulated conveyor belt comprised of a series of rods of similar length and flat connecting links firmly affixed respectively thereto by smoothly ground and polished weldments at the outer forward end thereof substantially transversely to one end of each rod at an inwardly inclined angle thereto to provide a shingled connecting link assembly for each side of said conveyor belt so that the inner side surfaces of said links respectively engage the outer side surfaces of said drive and idler sprockets, the opposite end of each link pivotally receiving the next adjacent rod adjacent the rearward end thereof, whereby the firm affixment of said links to said rods supports the opposite ends of said links in close slidable relationship with each other and thereby provides no appreciable spaces or surfaces within or upon which food particles may lodge or adhere and said conveyor is easily cleaned and maintained in a sanitary condition.

2. A conveyor frame according to claim 1 wherein said frame has a curved configuration and is provided with a curved configuration of articulated conveyor belt, said curved belt being assembled by said shingled connecting link arrangement in which the links on the convex side are longer than those on the concave side of the conveyor.

3. The conveyor frame according to claim 1 in which said elongated guide means comprise rail-like members having elongated anti-friction runner means along the upper surfaces thereof and slidably engaging the rods of said conveyor belt inwardly from the side edges of said belt.

* * * * *